United States Patent
Boudreau et al.

(10) Patent No.: US 12,381,933 B2
(45) Date of Patent: Aug. 5, 2025

(54) SYSTEMS AND METHODS FOR MONITORING APPLICATION ACTIVITY IN MICRO FRONTEND DEPENDENT APPLICATIONS WITHOUT USE OF A SHELL APPLICATION

(71) Applicant: Capital One Services, LLC, McLean, VA (US)

(72) Inventors: Christopher Boudreau, McLean, VA (US); Scott Gamon, Pleasanton, CA (US); Carlos Victorica-Orozco, Oakland, CA (US); Doorva Shandilya, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 244 days.

(21) Appl. No.: 18/326,871

(22) Filed: May 31, 2023

(65) Prior Publication Data

US 2024/0406247 A1 Dec. 5, 2024

(51) Int. Cl.
*H04L 67/025* (2022.01)
*G06F 21/50* (2013.01)

(52) U.S. Cl.
CPC ............ *H04L 67/025* (2013.01); *G06F 21/50* (2013.01)

(58) Field of Classification Search
CPC ... G06F 8/38; G06F 8/36; G06F 9/451; G06F 9/547; G06F 21/50; G06F 21/51; H04L 67/025; H04L 67/565
See application file for complete search history.

(56) References Cited

U.S. PATENT DOCUMENTS

2020/0285516 A1* 9/2020 Darling ..................... G06F 8/70
2021/0192106 A1* 6/2021 Bourhani .................. G06F 8/35
2021/0248205 A1* 8/2021 Tank ...................... G06F 16/986

* cited by examiner

*Primary Examiner* — Phuong H Nguyen
(74) *Attorney, Agent, or Firm* — Foley & Lardner LLP

(57) ABSTRACT

Systems and methods for a frontend architecture that comprise a first application that hosts a plurality of functions. The plurality of functions selects specific micro frontend fragments for specific applications. As the plurality of functions may select specific micro frontend fragments for specific applications at runtime and thus provide the needed governance, all new micro frontend fragments and their associated APIs may be onboarded immediately.

20 Claims, 6 Drawing Sheets

SYSTEMS AND METHODS FOR MONITORING APPLICATION ACTIVITY IN MICRO FRONTEND DEPENDENT APPLICATIONS WITHOUT USE OF A SHELL APPLICATION

BACKGROUND

An application shell (or "shell app") is a skeleton of a graphical user interface in the form of a basic set of static elements in HTML, CSS, and JavaScript. The shell app contains only components necessary to launch an application, but content data is absent. In some cases, the shell app may be cached on a client device to provide an almost immediate launch. To provide content, shell apps typically include a frontend framework that injects other applications into the shell. For example, a frontend framework is a collection of tools and processes that aim to improve the quality of frontend code while creating a more efficient and sustainable workflow. Conventional systems use a shell app to provide these tools and processes. Additionally, conventional systems rely on the shell app to provide governance over them (e.g., for security purposes). However, this creates two technical challenges.

First, shell apps lack flexibility. For example, with the advent of Web 2.0 technologies such as HTML5, AJAX, REST APIs, the complexities and expectations of web applications have grown manifold. While complexity and scaling come with their own technical challenges, these technical challenges are particularly exacerbated with the use of shell apps due to the static design (and predetermined content applications that may be injected into the shell app). For example, when a project is small, and utilizing the same developers, integrating projects into the shell app is straightforward. However, as the number of projects and functions grow, the inflexibility of the shell app becomes a burden as different projects require different functionalities that may not be supported by the shell app. Furthermore, modifications to the shell app itself to support these new functionalities may cause support for other features and functions to become corrupted.

Second, while the shell app itself may be launched quickly (e.g., in instances where the shell app is cached on a client device), each content application and/or application providing additional features or functionality is required to do its own start-up process. Thus, this may create significant time delays and user frustration as the user may see a framework of features and functions (e.g., cells in a user interface) that are either empty or non-responses to user inputs (e.g., as the underlying content application has not loaded).

SUMMARY

As an alternative to using a shell application, the systems and methods described herein relate to a novel frontend architecture that comprises an application, which hosts a plurality of capabilities. These capabilities may include application governance, analytics auto-tracking, browser monitoring, single sign-on, and/or other functions. Moreover, the novel frontend architecture provides these capabilities without the need for a shell application.

For example, instead of using a shell app to provide these capabilities, the systems and methods use an application that comprises a plurality of capabilities, which are linked to the application start-up. More specifically, the user can choose which capabilities he would like to enable for his micro frontend application. One such capability may relate to clickstream event tracking, browser monitoring, etc. Moreover, the systems and methods may allow for these capabilities to be added to an application via a user interface.

However, the lack of a shell app would conventionally add to a launch delay of the application. To compensate, the start-up procedures for the plurality of capabilities are linked to the start-up procedures for the application. For example, the system will enable all the capabilities the user specified at start-up. By doing so, the need for all of these individual micro frontends to each perform that operation at start-up is eliminated. As such, instances in which serial start-up processes create significant time delays and user frustration are limited.

In some aspects, systems and methods for generating micro frontend dependent applications featuring consistent application design and dynamically-determined application content across computer networks for application developer-specific application development are described. For example, the system may receive, at a user interface, a first user input, wherein the first user input comprises a first function for including in a micro frontend dependent architecture, wherein the first function corresponds to a first micro frontend fragment. The system may receive, at the user interface, a third user input, wherein the third user input defines a first application design attribute for the first function, wherein the first application design attribute comprises a design identifier for where the first function is presented in the micro frontend dependent architecture. The system may receive, at the user interface, a fourth user input, wherein the fourth user input defines a first application content attribute for the first function, wherein the first application content attribute comprises a content identifier for content populated in the first function in the micro frontend dependent architecture. The system may receive, at the user interface, a fifth user input, wherein the fifth user input requests generation of the micro frontend dependent architecture, wherein the micro frontend dependent architecture includes a first application for a first application developer. The system may populate, by the first micro frontend fragment, the first function with first application content in the first application by: determining a first data source corresponding to the first application developer; retrieving available first application content from the first data source; and filtering the available first application content based on the first application content attribute. The system may generate for display, at the user interface, the first application content, on a first device corresponding to the first application developer, at a display location based on the first application design attribute.

In some aspects, systems and methods for monitoring application activity in micro frontend dependent applications without using shell applications are described. For example, the system may receive, on a user device, a first user input to launch a first application on the user device, wherein the first application comprises a plurality of functions, and wherein each function of the plurality of functions comprises pre-approved application programming interfaces. The system may retrieve, from the plurality of functions, a clickstream event tracking function for the first application. The system may determine that the clickstream event tracking function includes a first micro frontend fragment and a second micro frontend fragment. The system may, in response to determining that the clickstream event tracking function includes the first micro frontend fragment and the second micro frontend fragment, execute an application start-up procedure for the first application, wherein the application start-up procedure includes a first instruction to the first micro frontend fragment to bootstrap a first start-up procedure for the first micro frontend fragment to the first application, and wherein the application start-up procedure includes a second instruction to the second micro frontend fragment to bootstrap a second start-up procedure for the second micro frontend fragment to the first application. The system may cause to be generated for display, in a user interface on the user device, the first application, wherein the first application comprises first content corresponding to the first micro frontend fragment and second content corresponding to the second micro frontend fragment.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

Figure 1:
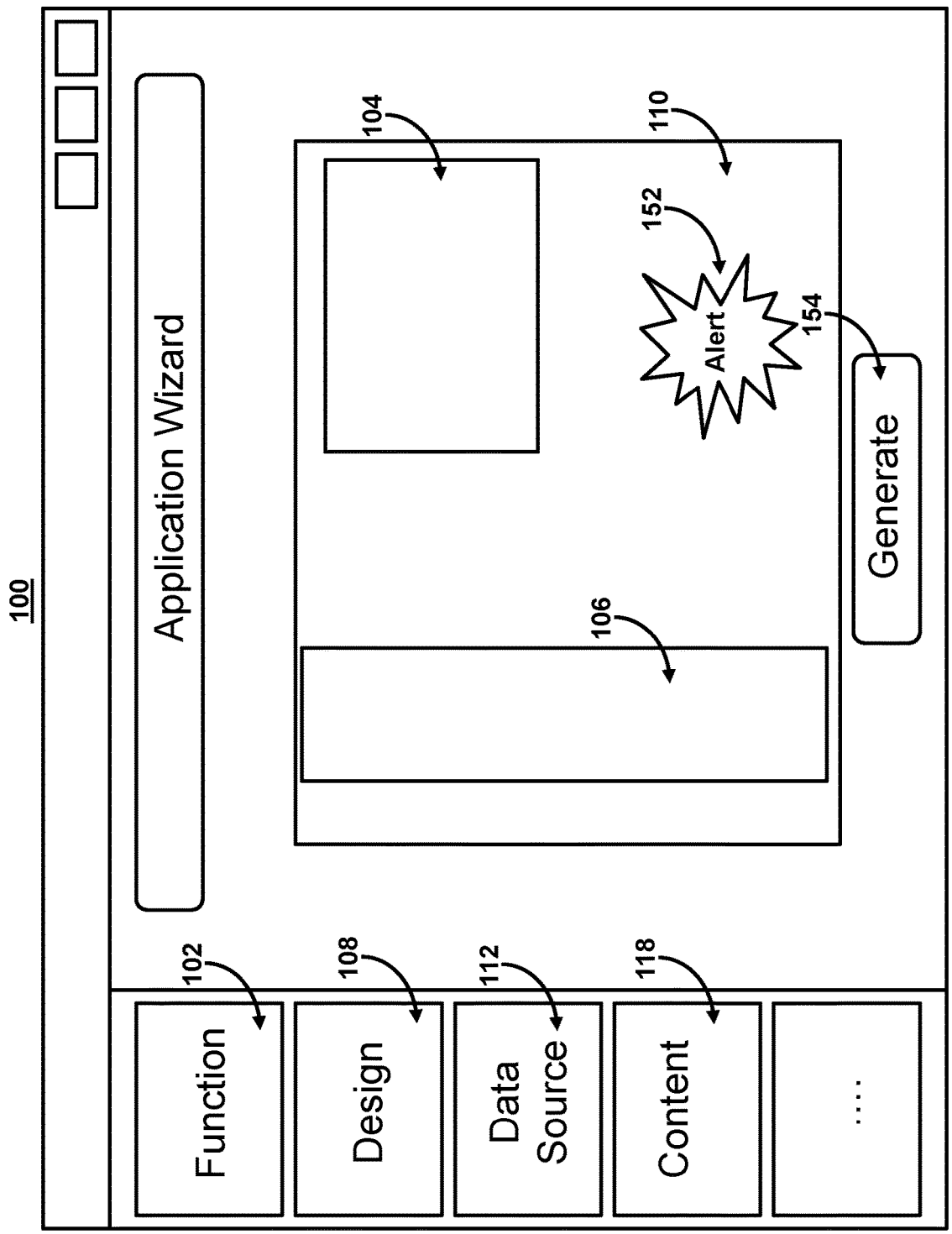
FIG. 1 shows an illustrative diagram for generating micro frontend dependent applications, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Micro frontends are components of web application user interfaces (e.g., front ends) that are composed from semi-independent fragments that can be built by different developers using different technologies. Micro frontend architectures resemble back-end architectures where back ends are composed from semi-independent microservices. By using the plurality of functions, the application may determine what micro frontend fragments, if any, are used. Thus, the use of the plurality of functions by the application provides an additional layer of functionality as well as a single, cohesive developer experience.

Furthermore, as the plurality of functions may select specific micro frontend fragments for specific applications at runtime and thus provide the needed functionality, all new micro frontend fragments and their associated APIs may be onboarded immediately. This increases flexibility, but also increases the scalability of the system. Additionally, the intermediary of the first application allows for the selected micro frontend fragments to bootstrap their start-up process to the first application. By doing so, the need for all of these individual micro frontends to each perform a respective start-up is not needed. As such, instances in which features and functions (e.g., cells in a user interface) that are either empty or non-responses to user inputs (e.g., as the underlying content application has not loaded) are reduced.

Systems and methods described herein may deliver content to one or more user interfaces. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Content may be provided for display on a user interface on a user device through, for example, micro frontend fragments.

As referred to herein, a "user interface" may comprise a human-computer interaction and communication in a device, and it may include display screens, keyboards, a mouse, and the appearance of a desktop. For example, a user interface may comprise a way a user interacts with an application or a website. User interfaces may occur on websites, in mobile applications, or in many software programs which may display content.

In some embodiments, application content may be personalized for a user (developer or end-user) based on the user preferences (e.g., as stored in a user profile) and/or a data source specific to the end-user (e.g., containing data about the end-user). A user profile may be a directory of stored user settings, preferences, and information related to a user (or end-user) account. For example, a user profile may have the settings for the user's installed programs and operating system. In some embodiments, the user profile may be a visual display of data associated with a specific user, or a customized desktop environment. In some embodiments, the user profile may be a digital representation of a person's identity. The data in the user profile may be generated based on the system actively or passively monitoring user activity (e.g., the system may present suggested functions for a micro frontend fragment dependent application based on the user's past activity).

FIG. 1 shows an illustrative diagram for generating micro frontend dependent applications, in accordance with one or more embodiments. For example, FIG. 1 includes function 102, which may be part of a function library. As referred to herein, a function may comprise code that provides a standard function model for an application. In some embodiments, a function may comprise a specific function and/or function of an application that is distinguishable from other functions and/or functions. For example, the function may be a web function that has a set of functions that provide a standard function model for web applications, and the function allows for encapsulation and interoperability of individual HTML5, AJAX, and/or REST APIs dependencies. For example, a function may provide encapsulation of, and interoperability between, a set of function dependencies. Additionally or alternatively, the function may correspond to a particular micro frontend fragment of a plurality of micro frontend fragments (e.g., in a library of micro frontend fragments).

In some embodiments, a function may comprise any capability of an application. For example, a computer application, also known as software or a program, may possess various capabilities that enable it to perform specific tasks or provide certain functionalities. In some embodiments, the function may comprise a data processing capability (e.g., processing and manipulating data in various ways, such as performing calculations, sorting, filtering, aggregating, and transforming data). In some embodiments, the function may comprise a user interface capability (e.g., a graphical user interface (GUI) or a command-line interface (CLI) capability used to interact with users, allowing them to input data, view output, and/or interact with the application's features). In some embodiments, the function may comprise a file management capability (e.g., related to creating, reading, writing, and/or manipulating files on a computer's storage system). In some embodiments, the function may comprise a networking capability (e.g., related to connection to networks, access to the internet, and/or communicating with other devices or servers to enable features like web browsing, email clients, instant messaging, and/or file transfer). In some embodiments, the function may comprise a multimedia support capability (e.g., related to various types of media, including images, audio, video, and/or animations such as editing, playback, recording, and/or conversion of multimedia files). In some embodiments, the function may comprise an automation capability (e.g., related to automating repetitive tasks, reducing manual effort and/or increasing efficiency). In some embodiments, the function may comprise a security and privacy capability (e.g., related to implementing security measures to protect data and ensure privacy such as user authentication, encryption, access controls, and secure communication protocols). In some embodiments, the function may comprise a data storage and retrieval (e.g., related to storing and retrieving data from databases or other data storage systems). In some embodiments, the function may comprise an integration and interoperability (e.g., related to integrating with other software systems, APIs, and/or services to exchange data or leverage additional functionalities). In some embodiments, the function may comprise an customization and configuration (e.g., related to providing options for users to customize settings, preferences, or workflows to suit their specific needs).

In one example, a function may comprise an analytics auto-tracking function such as clickstream event tracking. In some embodiments, clickstream event tracking may comprise monitoring and/or recording user interactions on a website and/or application. Clickstream event tracking may involve tracking and capturing data about the actions users take, such as clicks, page views, form submissions, and/or other events. The system may collect this data and then analyze it to gain insights into user behavior, optimize user experiences, and/or improve overall website or application performance.

To begin tracking clickstream events, the system may comprise (e.g., developers may request a micro frontend fragment that corresponds to) code snippets, usually in JavaScript, to relevant webpages and/or app screens. These code snippets are responsible for capturing and sending event data to a tracking system.

When a user interacts with the website and/or application, the tracking code captures specific events or actions. For example, the tracking code can track when a user clicks a button, submits a form, or views a particular page. The code can also capture additional information about the event, such as the timestamp, the user's IP address, browser type, and/or any other custom parameters that might be relevant.

Once an event is captured, the tracking code may send the event data to a tracking server or a third-party analytics service. This transmission can happen asynchronously in the background or synchronously as part of the user's request/response cycle. The event data may be received by the tracking server or analytics service, where it is stored and processed. The data may be stored in databases or data warehouses for later analysis. The processing step may involve filtering, aggregating, and transforming the raw event data into a more usable format. After the event data is stored and processed, it can be analyzed to gain insights into user behavior. Analysts and stakeholders can query the data, apply statistical models, and generate reports and visualizations to understand user engagement, conversion rates, user flows, and other relevant metrics. This analysis helps inform decisions about optimizing the website or application.

In another example, a function may comprise a single sign-on (SSO) function. SSO is a mechanism that allows users to authenticate themselves once and gain access to multiple systems or applications without the need to re-enter their credentials for each individual system. With SSO, a user can log in to a central identity provider or authentication service, commonly referred to as the Identity Provider (IdP), using their username and password or other authentication methods like biometrics. Once authenticated, the user is issued a token or a session cookie that serves as proof of their authentication. This token is then used to grant access to other systems or applications that are integrated with the same SSO infrastructure, commonly known as Service Providers (SPs). There are various protocols and standards used for implementing SSO, such as Security Assertion Markup Language (SAML), OpenID Connect (OIDC), and OAuth. These protocols define the exchange of authentication and authorization information between the IdP and SPs, ensuring secure and interoperable SSO implementations.

In another example, a function may comprise a new Relic Browser monitoring function. New Relic Browser monitoring works by instrumenting a client-side code of a website and/or web application. It collects data about the performance and behavior of the application as it is experienced by users in their web browsers. This data includes metrics such as page load times, network latency, JavaScript errors, and overall user experience. New Relic Browser captures data directly from real users' browsers, providing insights into how the application performs in different geographic regions, browsers, and devices. It helps identify performance bottlenecks and optimize the user experience. It also measures and reports various metrics related to page load times, including DNS resolution, network latency, server response time, and rendering time. This information helps identify areas of improvement to optimize page load performance.

In some embodiments, New Relic Browser monitoring tracks and reports JavaScript errors that occur in users' browsers. It provides detailed information about the error, including the stack trace and the affected user's context. This enables developers to identify and fix issues that could impact user experience. It may also monitor and measure the performance of AJAX requests made by the web application. This helps identify slow or failed requests, enabling developers to improve the responsiveness and reliability of the application. New Relic Browser may offer synthetic monitoring capabilities, allowing the system to simulate user interactions with an application from various locations around the world. This helps monitor application performance proactively and identify issues before they affect users.

The library of functions may be provided via an SDK, or Software Development Kit, which is a set of tools, libraries, and/or documentation provided by a software company or platform to developers. It aims to simplify the development process for creating applications or software that can run on a specific platform, framework, or operating system. SDKs often include various components such as APIs (Application Programming Interfaces), sample code, development tools, and sometimes emulator or simulator environments. These resources enable developers to build applications that interact with the platform or utilize its specific features and functionalities.

FIG. 1 shows user interface 100. User interface 100 includes content having a plurality of sections (e.g., section 104 and section 106). As referred to herein, a "section" may comprise any of the more or less distinct parts into which the content may be divided, or from which the content is composed. For example, a section may be distinguished from another section by one or more section attributes. In user interface 100, the system may identify a section of the plurality of sections as having a section attribute.

A section attribute may comprise any attribute that distinguishes one section from another. For example, a section attribute may be one or more criteria, constraints, and/or requirements for application content and/or application design in the section. For example, the section attribute may relate to content-related information (e.g., font size, media type (e.g., graph, audio, video, text, etc.) ordering, heading information, titles, descriptions, ratings information, source code data (e.g., HTML, source code headers, etc.), genre or category information, subject matter information, author/developer information, logo data, or other identifiers), format, file type, object type, objects appearing in the content (e.g., product placements, advertisements, keywords, context), or any other suitable information used to distinguish one section from another.

For example, user interface 100 includes section 106. The system may identify section 106 based on a paragraph or section break, and/or an HTML tag. The system may parse the section for threshold application content attributes (e.g., one or more criteria, constraints, and/or requirements for application content in the section). In some embodiments, the system may receive a selection of a content (e.g., via tab 118) or data source (e.g., via tab 112) for an application, function, and/or micro frontend fragment.

As referred to herein, an "application content attribute" may comprise an attribute related to content for application, function, and/or micro frontend fragment. For example, an application content attribute may relate to media-related information (e.g., font size, media type (e.g., graph, audio, video, text, etc.) ordering, heading information, titles, descriptions, ratings information, source code data (e.g., HTML, source code headers, etc.), genre or category information, subject matter information, author/actor information, logo data, or other identifiers), media format, file type, object type, objects appearing in the function (e.g., graphs, advertisements, keywords, context), or other data retrieved from an end-user specific database. For example, an application content attribute may comprise a content identifier for content populated in a function in the micro frontend dependent architecture. In some embodiments, an application content attribute may comprise a governance characteristic. As referred to herein, a "governance characteristic" may comprise an attribute related to governance for application, function, and/or micro frontend fragment.

Section 108 may comprise an option to indicate an application design attribute. As referred to herein, an "application design attribute" may comprise an attribute related to where or how application content for a function may appear in an application and/or micro frontend dependent architecture. For example, an application design attribute may indicate a location, size, shape, orientation, alignment, position, and/or other layout/formatting concern for the function in the application. For example, the application design attribute may comprise a design identifier for where a function is presented in a micro frontend dependent architecture.

The system may receive a user input selecting function 102 from a library of available functions, and the system places function 102 into section 106 of workspace 110. In response to the user input, function 102 may be oriented according to workspace 110. For example, section 106 may comprise line-based placement guides (or guides based on other shapes, arrangements, etc.) for defining areas into which a function may be placed. For example, workspace 110 may comprise a template, which may be blank or preconfigured. For example, a preconfigured template for a section may include predetermined sections, section attributes, functions, application content attributes, and/or application design attributes.

In some embodiments, the system may apply a constraint and/or requirement to a type of data in a function based on a selected application design attribute and/or an application content attribute. For example, as the system may not generate the actual data (e.g., populate the application content prior to creating an application), the system may need to automatically determine if a selected application design attribute interferes with and/or obscures data populated in a function. For example, an application design attribute setting a small size for a function may interfere with the ability of an end-user to see small type and/or a chart in the application. Therefore, the system may need to alert the user of this issue (e.g., generate alert 152). The system may then determine these issues based on comparisons with thresholds related to attributes. For example, the system may determine a threshold application content attribute based on an application design attribute. The system may compare the application content attribute to the threshold application content attribute. The system may apply the application content attribute to the function based on the application content attribute corresponding to the threshold application content attribute. If the system determines that the first application content attribute does not correspond to the threshold application content attribute, the system may generate an alert (e.g., alert 152).

Additionally or alternatively, in some embodiments, the system may apply a constraint and/or requirement to a type of data in a function based on a selected application content attribute of another function. For example, as the system may not generate the actual data (e.g., populate the application content prior to creating an application), the system may need to automatically determine if a selected application content attribute relates to data populated in another function. For example, if two adjacent functions are set to present the same type of data (e.g., the same content for two functions), the system may alert the user. The system may thus determine these issues based on comparisons with thresholds related to attributes and/or between two or more attributes of functions. For example, if an application (e.g., a micro frontend fragment dependent application) at run time (e.g., at a time the micro frontend dependent architecture is generated such as in response to a user input using generate tab 154) is configured to present a duplicate column of data based upon time period user input by the user, the system may cause one function to remove (or the system itself may remove) one of the two columns (e.g., modify the data attributes of one function) in order to improve the user experience. For example, adjacent function behavior constraints and/or alerts may be triggered by the system in reference to overlapping and/or competing size constraints (e.g., application design attributes as they related to application content attributes) based upon initial design time renders (e.g., automatic determination by the system prior to creating an application and/or the presentation of data in a preview configuration) of function content.

The system may receive user inputs (e.g., via the aforementioned tabs) adjusting sections, section attributes, functions, application content attributes, and/or application design attributes. For example, a user (e.g., a developer or other user of the application) may submit a request to change data fields (e.g., field names or other values), add data fields, or remove data fields of one or more functions. Based on the request, the system may implement the requested actions. The system may allow the user to enter the requests through a graphical user interface, and without having to access underlying end-user specific data.

The system may receive user inputs via one or more drop down menus or other options. Each of the drop down menus may include one or more data fields, at least some of which may be customized via supplemental information (e.g., application metadata) that is obtained from one or more databases (e.g., over a network from application databases), and loaded to user interface 100 at application launch (or any other application state triggering the obtainment or loading of the data fields). In one use case, the system may receive a user input selecting one or more of the data fields of drop down menus to generate an application (e.g., a micro frontend fragment dependent application). A selected data field (or a combination of data fields) may correspond to a data calculation, a query operation, or other operation. For example, when the user submits a request to generate a micro frontend fragment dependent application based on the selected data fields, such corresponding operations may be invoked by a query subsystem (or other functions of the system) to obtain the results for the micro frontend fragment dependent application. A data calculation operation may include one or more statistical or other mathematical calculations performed on data retrieved via one or more queries (e.g., data that correspond to the parameters of the data calculation and is stored in tables or other data sources). A query operation may include one or more queries or query operators (e.g., a join condition to join data that corresponds to the parameters of the query operation and is stored in a table or other data sources).

Figure 2A:
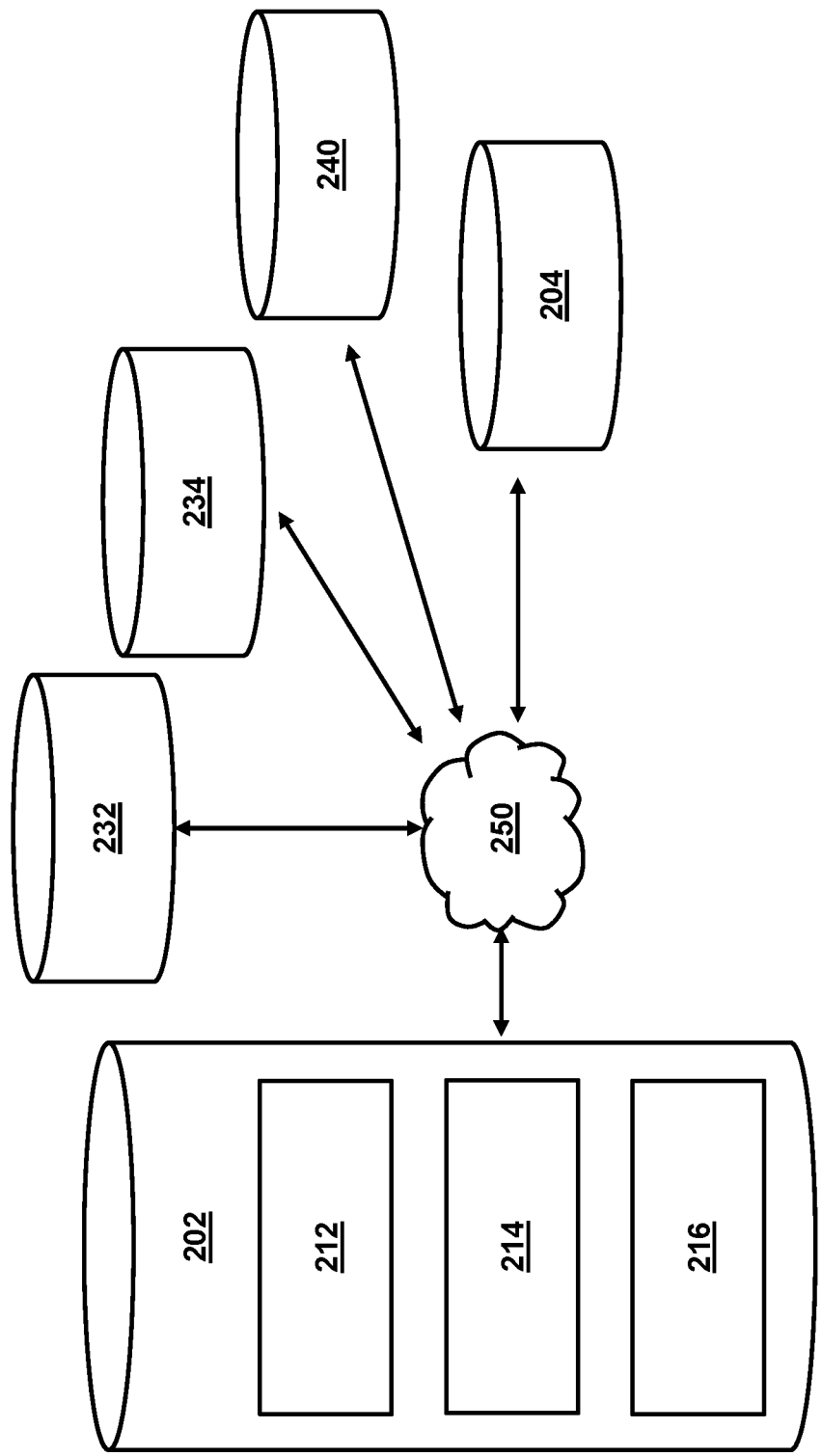
FIGS. 2A-B shows an illustrative diagram for monitoring application activity in micro frontend dependent applications, in accordance with one or more embodiments.
Figure 2B:
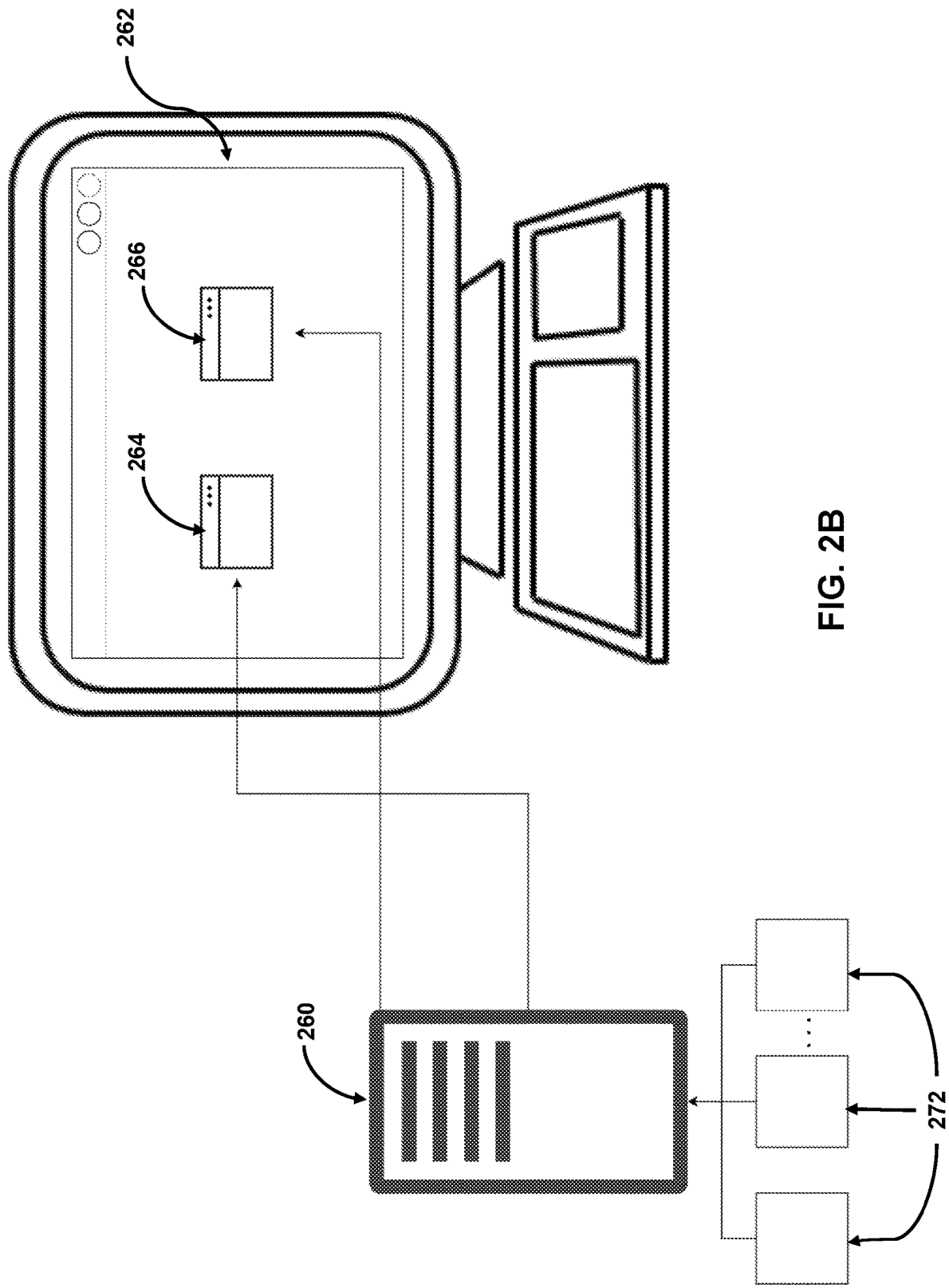

FIGS. 2A-B shows an illustrative diagram for monitoring application activity in micro frontend dependent applications, in accordance with one or more embodiments. FIG. 2A shows an illustrative diagram for selecting functions, authorizing APIs, and generating frontend content for display to the user, in accordance with one or more embodiments. For example, FIG. 2A shows micro frontend system 202 for selecting and enabling functions to provide content to a micro frontend fragment dependent architecture. Micro frontend system 202 includes function selection subsystem 212, API authorization subsystem 214, and start-up subsystem 216. It should be noted that as referred to herein, one or more of the components of the platform service and/or function registry may be referred to collectively as the "system". The system (e.g., system 250) may include all components of micro frontend system 202, function repository 232, function reference database 234, and governance protocol database 240, and may communicate with one or more data sources and/or user device(s) 204.

Function repository 232 includes a plurality of functions which may be used by one or more applications. As referred to herein, a function may comprise a plurality of functions. As described herein, a function may include any option and/or functional capability provided to a user by software and/or hardware. For example, a function may include a distinctive attribute or aspect (e.g., related to performance, portability, and/or functionality) of the software and/or hardware. For example, in some embodiments, a function may be an available feature of a program, operating system, and/or device. In some embodiments, the function may be provided as part of an application and/or may be provided as a plug-in, applet, browser extension, and/or other software component for an existing application. For example, the function may be part of an application and/or other program that may be toggled on or off. In another example, the function may be a software component that may be added and/or removed from an application. A function may comprise a plurality of functions. For example, the first application may use the functions in the plurality of functions to support content sent to the application (e.g., through the use of micro frontend fragments).

Each feature may display particular information and/or information of a particular type. Alternatively or additionally, each function may provide a given feature. This function may be a locally performed function (e.g., a function performed on a local device) or this function may be a remotely-executed function. In some embodiments, a function may represent a link to additional information and/or other functions, which may be accessed and/or available locally or remotely. In some embodiments, the functions may be represented by textual and/or graphical information.

Function selection subsystem 212 may select a function from a plurality of functions (e.g., function repository 232) for an application based on its application requirements. The system may select a function based on user preferences, device setting capabilities, function availability, consistency with one or more governance protocols, etc.

Function selection subsystem 212 may receive a function reference and parse the plurality of functions (e.g., function repository 232) using the function reference. The system may retrieve a function reference (e.g., metadata or other information that describes the feature) from function reference database 234 about one or more functions (e.g., from function repository 232). Function reference database 234 includes function references which may include information about the purpose, functions, origin, system requirements (including required formats and/or capabilities), author, recommended use and/or user, related features (including features designated as complimentary, redundant, and/or incompatible) of the functions. In some embodiments, the system may allow for the injection of brand-specific assets by specifications in a function reference. For example, a brand may have a specific look and feel, and the system may select specific assets (e.g., a header, footer, font, etc.) corresponding to the brand by matching function references to those specific assets. Such information may also be stored in function reference database 234.

The function reference may include a description that may be expressed in a human and/or computer readable language. The function reference may also include a reference or pointer to user profile information that may be relevant to the selection and/or use of the functions. The system may retrieve this information and/or compare it to the description in order to select and/or use the functions. For example, the description may indicate that the functions use a particular format and/or displays data in a particular language. The system may retrieve information from a user and/or device profile that indicates a device format associated with the user, a language setting associated with the user, and/or other information. The system may then determine whether or not the retrieved information corresponds to the description.

To select a function from function repository 232, function selection subsystem 212 may ensure that the function complies with device capabilities of user device(s) 204. In doing so, it may retrieve a device capability requirement based on the function reference and filter available functions in the plurality of functions based on the device capability requirement. For example, the system may access a device profile. The device profile may be stored locally on a device and/or remotely. The device profile may include information about a device. The information may be generated actively and/or passively and may include information about capabilities, processing requirements of the device, and/or device limitations (e.g., resolutions, screen size, etc.). The device profile may also include information aggregated from one or more sources (including third-party sources) such as manufacturer requirements, settings, etc.

To select a function from function repository 232, function selection subsystem 212 may also ensure that the function complies with user preferences. In doing so, it may retrieve a user preference based on the function reference and filter available functions in the plurality of functions based on the user preference. For example, the system may access a user profile. The user profile may be stored locally on a user device and/or remotely. The user profile may include information about a user and/or a device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a function toward a user and/or customize functions for a user.

In addition, to select a function from function repository 232, function selection subsystem 212 may determine a respective status of each function of the plurality of functions and filter the plurality of functions based on the respective status. For example, some or all functions in a function may be removed or replaced with an alternative function based on the current availability status of the function (e.g., if a function is currently down, then a similar function is selected). In addition, the system may determine an alternative function for the clickstream event tracking function, and determine an alternative micro frontend fragment corresponding to the alternative function. In some embodiments, the function and the alternative function are streamed as an associated pair/set to the device, and, if one of the functions (or functions) is detected to be down, the system may use the alternative function in its place.

In addition, the system may determine an alternative function for the clickstream event tracking function and determine an alternative micro frontend fragment corresponding to the alternative function. In some embodiments, the function and the alternative function are streamed as an associated pair/set to the device, and, if one of the functions (or functions) is detected to be down, the system may use the alternative function in its place.

One or more components of the selected function may utilize APIs which require authorization by the system. For example, a function may include a first micro frontend fragment and a second micro frontend fragment. The first micro frontend fragment includes a first web application component, and the first micro frontend fragment may use a first microservice to provide first content. The second micro frontend fragment includes a second web application component, and the second micro frontend fragment may use a second microservice to provide second content. In response to determining that the clickstream event tracking function includes the first micro frontend fragment, the system may determine a first application programming interface (API) for the first micro frontend fragment. The system may generate a first authorization request to API authorization subsystem 214 to authorize the first application programming interface for the first micro frontend fragment. The system may need to authorize the first API based on a governance protocol, which it may retrieve from governance protocol database 240. As referred to herein, a governance protocol comprises any protocol that may dictate requirements for authorization.

The system may retrieve a first application characteristic of the first application programming interface and retrieve a first governance characteristic of the governance protocol. The system may compare the first application characteristic to the first governance characteristic. For example, the system may require a centralized approval to add a new API. This approval may be based on authorization by the governance protocol. The authorization may require determination of whether one or more characteristics of the API are consistent with the governance protocol.

API authorization subsystem 214 may choose not to authorize an API in certain cases. For example, the system may receive a second authorization request to authorize a second application programming interface for the first micro frontend fragment. For example, the system may retrieve a governance protocol and reject the second authorization request based on the governance protocol. For example, if the system determines that a new API is inconsistent with a governance protocol, the system may generate a query. The query may request additional information, generate a notification to a user (e.g., for manual review), and/or transmit an error message.

Upon selecting a function and approving one or more APIs corresponding to the function, the system may perform a start-up procedure for the first application using start-up subsystem 216. The application start-up procedure may include loading the first application corresponding to the platform service, and in response, loading the first micro frontend fragment. For example, the system may bootstrap start-up procedures for one or more micro frontend fragments to the platform service. As such, the system may boot or load a micro frontend fragment to a device using a much smaller initial application for the micro frontend fragment contained in another application. After start-up subsystem 216 loads the first application and the first micro frontend fragment, it may cause the first application to be generated for display, in a user interface on the user device.

For example, the system may detect a likelihood of use of the first content and pre-fetch the first content during start-up of the first application. For example, content for a first function (e.g., icons, brand-specific assets, graphical elements, libraries, etc.) may be pre-fetched by the system prior to a user activating a corresponding function. The system may pre-fetch this information based on information in the user profile (e.g., a user preference or setting), a predetermined or standard function selection (e.g., by the application), a previously selected feature (e.g., a feature that was present the last time the application was used), and/or a real-time determination that a user is likely to use the first function. For example, plurality of functions may continuously, and in real-time, update information about a user. The system may continuously pre-fetch this information and/or may push this information to a local user device and/or edge server for immediate use when an application is activated. The system may also use function selection subsystem 212 to re-select a function appropriately reflective of the updated user preferences or other information. Accordingly, the system may minimize delays attributed to populating functions, functions templates, and/or providing information related to the functions.

FIG. 2B shows multiple components of the system enabling content to be delivered to a user interface through two micro frontend fragments. User interface 262 is a user interface, in particular a webpage. It contains micro frontend fragment 264 and micro frontend fragment 266. They may, for example, display brand-specific assets like a trademark, custom header/footer, etc. Micro frontend fragment 264 and micro frontend fragment 266 may be selected as part of a function. That function may be selected from the plurality of functions and be approved by component 260 as meeting user preferences and device capability requirements. In addition, that function may be recognized as being of an operational status. For example, a user preference may be an interactable logo on this user interface, and a device capability might be support for Cascading Style Sheets (CSS). The function may be selected as satisfying both criteria.

The system may select additional functions in lieu of micro frontend fragment 264 and micro frontend fragment 266 in case it encounters a runtime error when the user interface loads. For example, the system may parse the plurality of functions using one or more function references to find an alternative function. The alternative function may accomplish the same result as micro frontend fragment 264 and micro frontend fragment 266. For example, the alternative function may also display an interactable logo using CSS. Component 260 may send the alternative function to user interface 262 to be activated if micro frontend fragment 264 and micro frontend fragment 266 become unavailable.

Component 260 may be a server or processor running one or more programs that embody system 250. Component 260 selects micro frontend fragment 264 and micro frontend fragment 266 for display on user interface 262 and approves corresponding APIs using a governance protocol. Because micro frontend fragments are independent pieces of software not under the control of a shell application, the system needs to determine a method of accessing them while maintaining structure in a user interface along particular guidelines. The system thus selects APIs which allow access to micro frontend fragments (e.g., micro frontend fragment 264 and micro frontend fragment 266) and then approves APIs according to a governance protocol. For example, the system may select API set 272, containing one or more APIs that enable the system to load micro frontend fragment 264 and micro frontend fragment 266 and APIs that load the alternative function. The system may compare API set 272 against a governance protocol (e.g., each API has a valid descriptor document, supports create, read, update and delete functionalities, etc.) to approve one or more APIs. By using one or more APIs in API set 272, the system may bootstrap micro frontend fragments (e.g., micro frontend fragment 264 and micro frontend fragment 266). The system may pre-fetch one or more micro frontend fragments for faster start-up.

Figure 3:
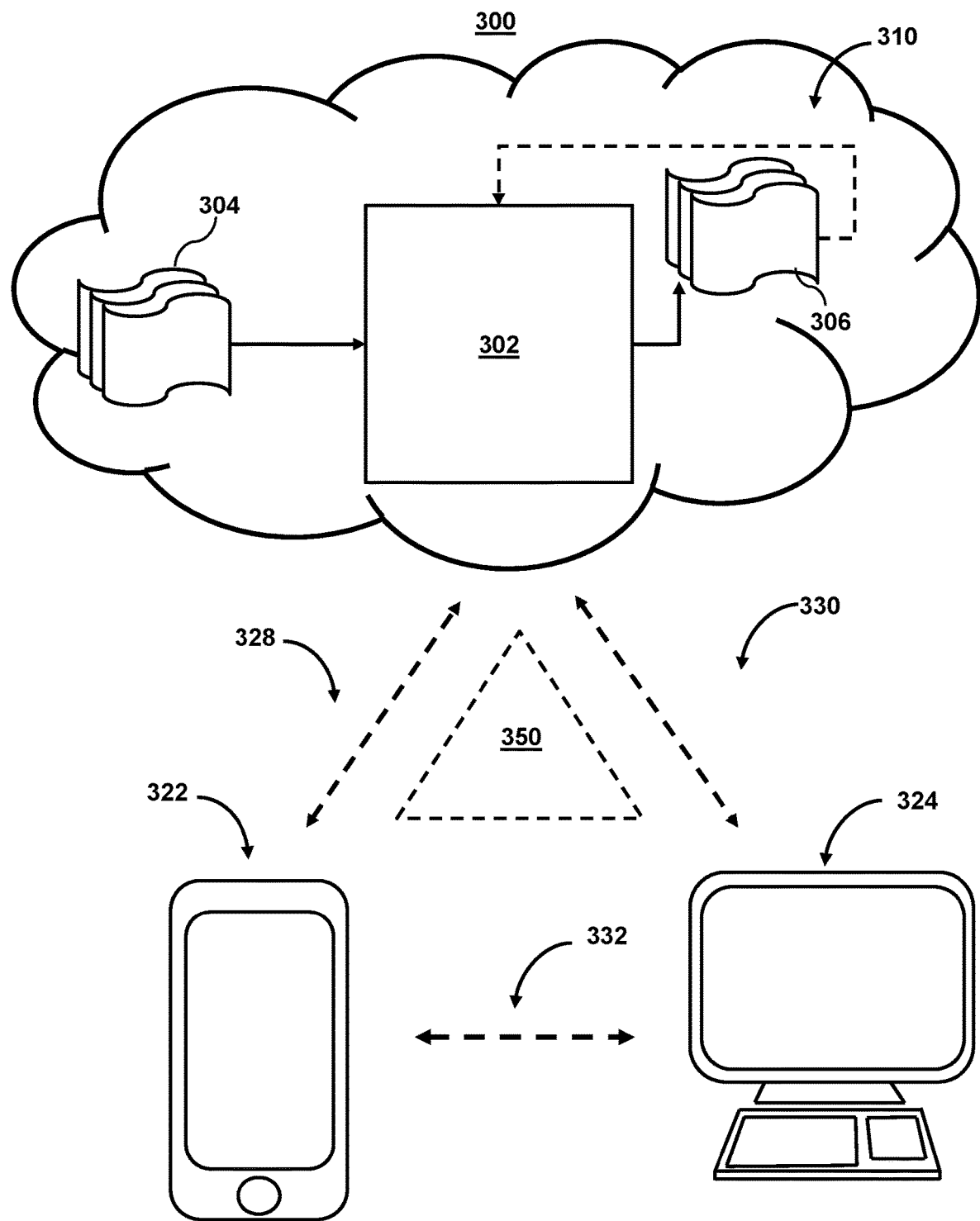
FIG. 3 shows illustrative components for a system for micro frontend dependent applications, in accordance with one or more embodiments.

FIG. 3 shows illustrative components for a system used to select functions and/or approve APIs, in accordance with one or more embodiments. For example, FIG. 3 may show illustrative components for sending micro frontend fragments to user interfaces. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include micro frontend system 202, and may access function repository 232, function reference database 234, governance protocol database 240, and user device(s) 204. Cloud components 310 may also include component 260, which may approve API set 272 and send content to user interface 262.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether an application characteristic meets a governance characteristic).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether an application characteristic meets a governance characteristic).

In some embodiments, the model (e.g., model 302) may automatically perform actions based on outputs 306. In some embodiments, the model (e.g., model 302) may not perform any actions. The output of the model (e.g., model 302) may be used to determine whether an application characteristic meets a governance characteristic.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
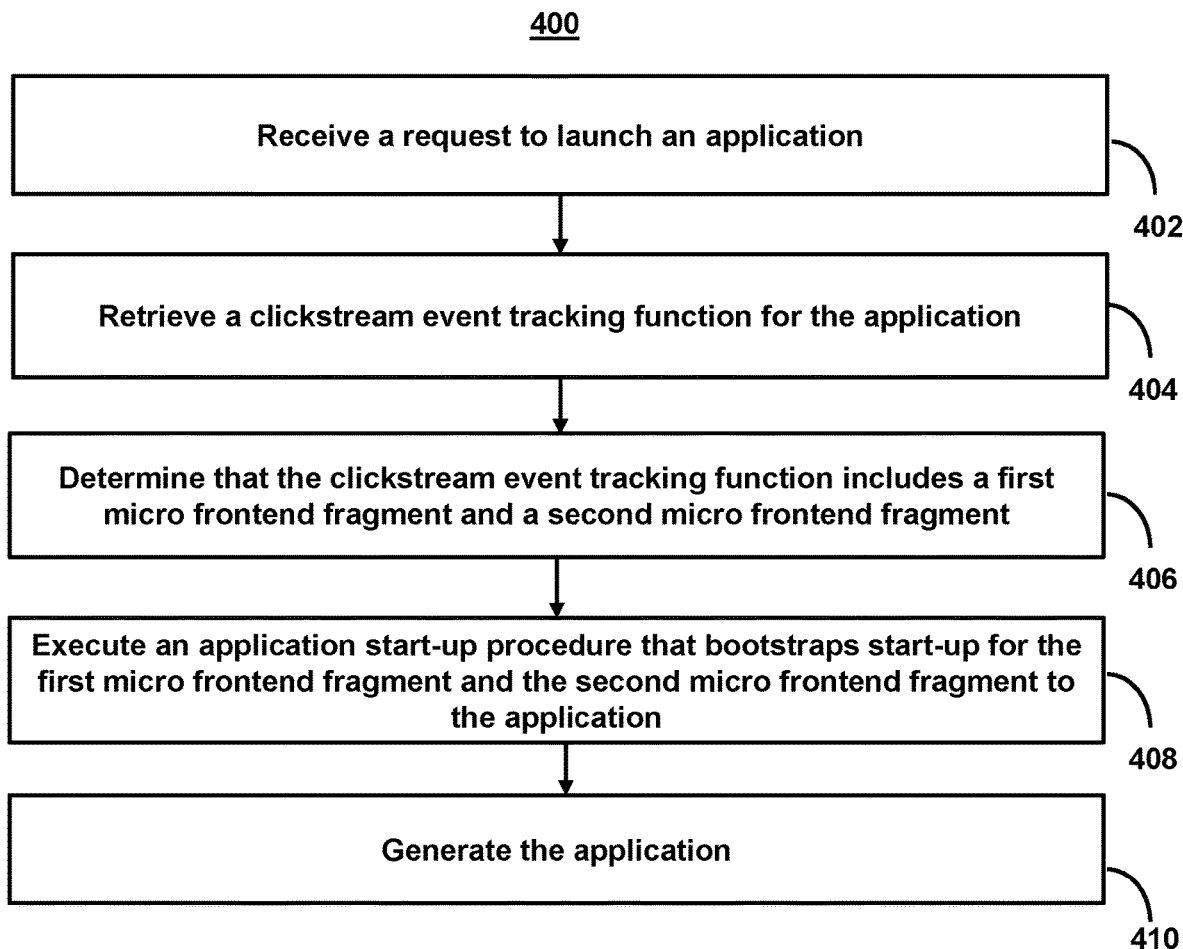
FIG. 4 shows a flowchart of the steps involved in generating micro frontend dependent applications, in accordance with one or more embodiments.

FIG. 4 shows a flowchart of the steps involved in generating micro frontend dependent applications, in accordance with one or more embodiments. For example, the system may use process 400 (e.g., as implemented on one or more system components described above) in order to display content in a user interface in a micro frontend framework without reference to shell applications. For example, the system may use process 400 to provide a user interface that allows developers to select different functions corresponding to different micro frontend fragments. The system may receive inputs via a user interface to configure a micro frontend application's appearance and/or behavior, enabling certain capabilities or not. Upon publication of that configuration, the micro frontend application's appearance and behavior would be updated accordingly.

At step 402, process 400 (e.g., using one or more components described above) receives a request to launch an application. For example, process 400 may receive, on a user device, a first user input to launch a first application on the user device. The first application includes a plurality of functions, which includes a plurality of functions. Each function of the plurality of functions contains pre-approved application programming interfaces. For example, the function may comprise a plurality of functions.

The function may include any option and/or functional capability provided to a user by software and/or hardware. Specifically, the first application may use the functions in the plurality of functions to support content sent to the application (e.g., through the use of micro frontend fragments). The first application may use the steps described below to execute actions such as selecting a function from a plurality of functions, identifying APIs corresponding to the function, and causing display of content in the first application corresponding to the function. The first application may use, for example, micro frontend system 202 (FIG. 2A).

In some embodiments, the first micro frontend fragment may comprise a first web application component, wherein the first micro frontend fragment uses a first microservice to provide first content. The second micro frontend fragment may comprise a second web application component, and wherein the second micro frontend fragment uses a second microservice to provide second content.

At step 404, process 400 (e.g., using one or more components described above) retrieves a clickstream event tracking function for the application. For example, process 400 may retrieve, from the plurality of functions, a clickstream event tracking function for the first application. The system may determine an application requirement for the first application and select the clickstream event tracking function from a plurality of functions based on the application requirement. For example, the system may select a function (e.g., using function selection subsystem 212 (FIG. 2A)) based on user preferences, device setting capabilities, function availability, consistency with one or more governance protocols, etc. In some embodiments, the system may allow for the injection of brand-specific assets. For example, a brand may have a specific look and feel, and the system may select specific assets (e.g., a header, footer, font, etc.) corresponding to the brand. In some embodiments, the function and/or functions available in the plurality of functions may continuously change as new functions and/or governance protocols are added. To do so, the system may determine a requirement of the application and select a function (or functions) that meets the requirement.

To select the clickstream event tracking function from a plurality of functions, the system may determine a respective status of each function of the plurality of functions and filter the plurality of functions based on the respective status. For example, some or all functions in a function may be removed or replaced with an alternative function based on the current availability status of the function (e.g., if a function is currently down, then a similar function is selected).

In addition, the system may determine an alternative function for the clickstream event tracking function. The system may then determine an alternative micro frontend fragment corresponding to the alternative function. In some embodiments, the function and the alternative function are streamed as an associated pair/set to the device, and, if one of the functions (or functions) is detected to be down, the system may use the alternative function in its place.

In order to select the clickstream event tracking function from a plurality of functions, the system may retrieve the clickstream event tracking function for the first application from the plurality of functions (e.g., function repository 232 (FIG. 2A)). For example, the system may receive a function reference (e.g., from function reference database 234 (FIG. 2A)) and parse the plurality of functions using the function reference. The system may include a function reference (e.g., metadata or other information that describes the feature) about one or more functions. For example, the function reference may include information about the purpose, functions, origin, system requirements (including required formats and/or capabilities), author, recommended use and/or user, related features (including features designated as complimentary, redundant, and/or incompatible) of the functions. The function reference may include a description that may be expressed in a human and/or computer readable language. The function reference may also include a reference or pointer to user profile information that may be relevant to the selection and/or use of the functions. The system may retrieve this information and/or compare it to the description in order to select and/or use the functions. For example, the description may indicate that the functions use a particular format and/or displays data in a particular language. The system may retrieve information from a user and/or device profile that indicates a device format associated with the user, a language setting associated with the user, and/or other information. The system may then determine whether or not the retrieved information corresponds to the description.

Parsing the plurality of functions using the function reference may include retrieving a device capability requirement based on the function reference and filtering available functions in the plurality of functions based on the device capability requirement. For example, the system may access a device profile. The device profile may be stored locally on a device and/or remotely. The device profile may include information about a device. The information may be generated actively and/or passively and may include information about capabilities, processing requirements of the device, and/or device limitations (e.g., resolutions, screen size, etc.). The device profile may also include information aggregated from one or more sources (including third-party sources) such as manufacturer requirements, settings, etc.

Parsing the plurality of functions using the function reference may include retrieving a user preference based on the function reference and filtering available functions in the plurality of functions based on the user preference. For example, the system may access a user profile. The user profile may be stored locally on a user device and/or remote. The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a function toward a user and/or customize functions for a user.

At step 406, process 400 (e.g., using one or more components described above) determines that the clickstream event tracking function includes a first micro frontend fragment and a second micro frontend fragment. For example, process 400 may determine that the clickstream event tracking function includes a first micro frontend fragment and a second micro frontend fragment. Examples of micro frontend fragments are described in FIG. 2, as micro frontend fragment 264 and micro frontend fragment 266. The first micro frontend fragment includes a first web application component, and the first micro frontend fragment may use a first microservice to provide first content. The second micro frontend fragment includes a second web application component, and the second micro frontend fragment may use a second microservice to provide second content. In response to determining that the clickstream event tracking function includes the first micro frontend fragment, the system may determine a first application programming interface (API) for the first micro frontend fragment. In response to determining the first application programming interface for the first micro frontend fragment, the system may generate a first authorization request to authorize a first application programming interface for the first micro frontend fragment. For example, conventional systems that rely on a shell app would require pre-authorization of any API used by a micro frontend fragment. These conventional systems would require this because the shell app would need to inject the code of the API into the shell app at runtime. If there is a new (e.g., unauthorized) API, the shell app could not process the new API. That is, in a shell app, the governance is performed first, and the onboarding later. The system allows this process to be done in reverse, and by doing so achieves faster onboarding and greater flexibility.

The system may receive a first authorization request to authorize a first application programming interface for the first micro frontend fragment. The system may retrieve a governance protocol (e.g., from governance protocol database 240) and authorize the first API based on the governance protocol. In some embodiments, the lack of a shell application makes governance more difficult. The system may deal with the increased difficulty in governance through the use of a front-end proxy and a URL source resource board that executes a governance protocol. As referred to herein, a governance protocol comprises any protocol that may dictate requirements for authorization. The system may retrieve a governance protocol and authorize the first application programming interface based on the governance protocol.

For example, authorizing the first application programming interface based on the governance protocol may include retrieving a first application characteristic of the first application programming interface and retrieving a first governance characteristic of the governance protocol. The system may compare the first application characteristic to the first governance characteristic. For example, the system may require a centralized approval to add a new API. This approval may be based on authorization by the governance protocol. The authorization may require determination of whether one or more characteristics of the API are consistent with the governance protocol.

The system may receive a second authorization request to authorize a second application programming interface for the first micro frontend fragment. For example, the system may retrieve a governance protocol and reject the second authorization request based on the governance protocol. For example, if the system determines that a new API is inconsistent with a governance protocol, the system may generate a query. The query may request additional information, generate a notification to a user (e.g., for manual review), and/or transmit an error message.

At step 408, process 400 (e.g., using one or more components described above) executes an application start-up procedure that bootstraps start-up for the first micro frontend fragment and the second micro frontend fragment to the application. Process 400 may execute an application start-up procedure for the first application. In some embodiments, the application start-up procedure includes loading the first application corresponding to the platform service, and in response loading the first micro frontend fragment. For example, the system may bootstrap start-up procedures for one or more micro frontend fragments to the platform service. As such, the system may boot or load a micro frontend fragment to a device using a much smaller initial application for the micro frontend fragment contained in another application. By doing so, the system may reduce overall load time.

At step 410, process 400 (e.g., using one or more components described above) generates the application. For example, process 400 may cause the first application to be generated for display, in a user interface on the user device. For example, the system may detect a likelihood of use of the first content and pre-fetch the first content during start-up of the first application. For example, content for a first function (e.g., icons, graphical elements, libraries, etc.) may be pre-fetched by the system prior to a user activating a corresponding function. The system may pre-fetch this information based on information in the user profile (e.g., a user preference or setting), a predetermined or standard function selection (e.g., by the application), a previously selected feature (e.g., a feature that was present the last time the application was used), and/or a real-time determination of a user likely to use the first function. For example, plurality of functions may continuously, and in real-time, update information about a user. The system may continuously pre-fetch this information and/or may push this information to a local user device and/or edge server for immediate use when an application is activated. Accordingly, the system may minimize delays attributed to populating functions, functions templates, and/or providing information related to the functions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
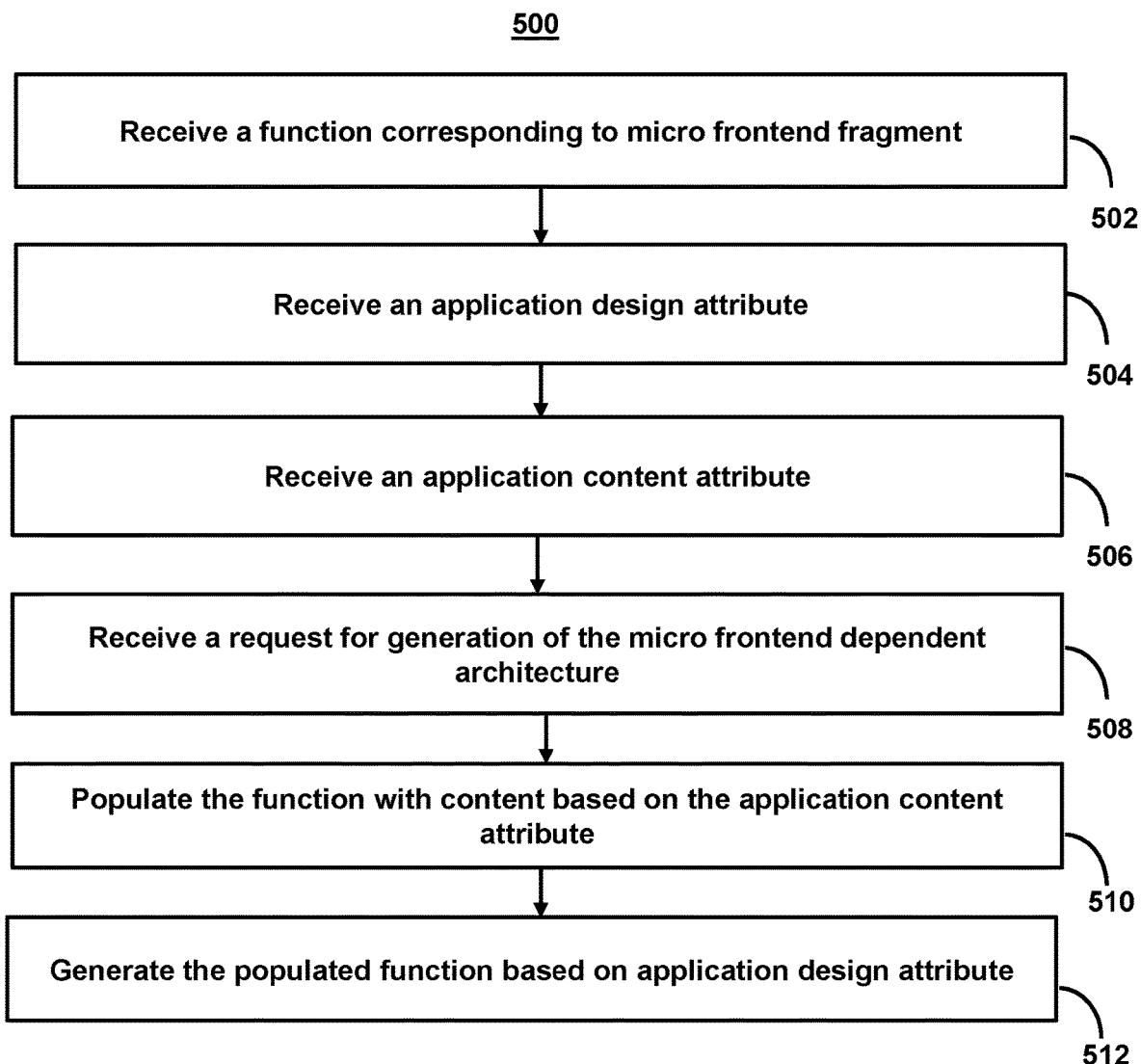
FIG. 5 shows a flowchart of the steps involved in monitoring application activity in micro frontend dependent applications, in accordance with one or more embodiments.

FIG. 5 depicts a process for generating micro frontend dependent applications featuring consistent application design and dynamically-determined application content across computer networks. For example, FIG. 5 shows process 500, which may be implemented by one or more devices. The system may implement process 500 in order to generate one or more of the user interfaces (e.g., as described in FIGS. 1 and 2A-2B). For example, process 500 may be used by a system in environments where there is a need for end-user specific data (e.g., customized content) while simultaneously avoiding excess storage requirements, processing requirements and privacy/security concerns. It should be noted that, as described herein, the various user inputs may be entered via a graphical user interface (e.g., user interface 100 (FIG. 1)). For example, the system may use process 500 to provide an auto-analytics tracker that uses a bootstrapping start-up feature to implement clickstream tracking. For example, a user can choose to enable various monitoring capabilities in his micro frontend application or not. This monitoring may include (but is not limited to) frontend page performance (e.g., browser-based performance metrics and JavaScript error) monitoring and/or web analytics (e.g., user navigation and click activity) monitoring.

At step 502, process 500 (e.g., using one or more components described above) receives a function corresponding to micro frontend fragment(s). For example, the system may receive, e.g., by control circuitry, a first user input, wherein the first user input comprises a first function for including in a micro frontend dependent architecture, wherein the first function corresponds to a first micro frontend fragment. For example, each application in a micro frontend dependent architecture (e.g., the micro frontend dependent architecture that are included in a mass distribution) may comprise a series of functions. Each function may provide encapsulation of, and interoperability between, a set of function dependencies for that function. Furthermore, each function may correspond to a micro frontend fragment that is specific for that function.

For example, the system may retrieve the first function from a library of available functions. The system may then retrieve the first micro frontend fragment from a plurality of micro frontend fragments, wherein each micro frontend fragment of the plurality of micro frontend fragments comprises a rendering engine specific to a respective function of the library of available functions. For example, the rendering engine may comprise software that draws text and images on the screen. The rendering engine may draw structured text from a document (e.g., HTML), and may format it properly based on the given style declarations (e.g., CSS).

In some embodiments, the system may generate an application that comprises multiple functions. For example, the system may receive a second user input, wherein the second user input comprises a second function for including in the micro frontend dependent architecture, and wherein the second function corresponds to a second micro frontend fragment. For example, the second micro frontend fragment may cause functions and/or have dependencies that are different that the first micro frontend fragment. The system may receive a sixth user input, wherein the sixth user input defines a second application content attribute for the second function, wherein the second application content attribute comprises a content identifier for content populated in the second function in the micro frontend dependent architecture. The system may populate, by the second micro frontend fragment, the second function with second application content in the first application. In some embodiments, the system may populate the second function by determining the first data source corresponding to the first application developer, retrieving available second application content from the first data source, filtering the available second application content based on the second application content attribute. For example, the second micro frontend fragment may access the same data (e.g., data specific to a particular end-user) as the first micro frontend fragment, but may cause different functions to occur (e.g., aggregate different data, generating different graphics, etc.).

At step 504, process 500 (e.g., using one or more components described above) receives an application design attribute for the first function. For example, the system may receive, e.g., by the control circuitry, a third user input, wherein the third user input defines a first application design attribute for the first function, wherein the first application design attribute comprises a design identifier for where the first function is presented in the micro frontend dependent architecture.

For example, the application may be segmented into different sections, and each section may have different section attributes (e.g., constraints and/or requirements related to size, formatting, data types, etc.). The system may express these section attributes through various thresholds. For example, the system may determine a section attribute for a section, in the micro frontend dependent architecture, comprising the first function. For example, each application based on the micro frontend dependent architecture may comprise a series of sections that defines a layout of the micro frontend dependent architecture, and each section of the series of sections may be defined by a respective grid, the boundaries of which are defined by one or more section attributes.

The system may then determine a threshold application design attribute based on the section attribute. The system may compare the first application design attribute to the threshold application design attribute. For example, in response to determining that the attribute meets and/or exceeds the threshold, the system may use the application design attribute. For example, the system may apply the first application design attribute to the first function based on the first application design attribute corresponding to the threshold application design attribute. If the system determines that the first application design attribute does not correspond to the threshold application design attribute, the system may generate an alert (e.g., alert 152 (FIG. 1)).

At step 506, process 500 (e.g., using one or more components described above) receives an application content attribute for the function. For example, the system may receive, e.g., by the control circuitry, a fourth user input, wherein the fourth user input defines a first application content attribute for the first function, wherein the first application content attribute comprises a content identifier for content populated in the first function in the micro frontend dependent architecture. For example, the system may standardize the application design (e.g., the layout, format, and/or graphical attributes) of each function in the micro frontend dependent architecture, but the system relies on the function specific micro frontend fragment to populate the end-user specific content for each function. For example, the first application design attribute for the first function may comprise a mapping of the first function to the respective grid of a section of the series of sections in which the first function is presented in the micro frontend dependent architecture. The system may define the grid according to one or more thresholds against which the mapping is compared.

In some embodiments (e.g., as described in FIG. 4 above), the system may receive a seventh user input, wherein the seventh user input defines a third application design attribute for the first function, wherein the third application design attribute comprises an identifier for what shape (e.g., a shape identifier) the first function is presented in the micro frontend dependent architecture. For example, the system may receive user inputs that define the size and/or shape of the function. Additionally or alternatively, the system may determine a second application design attribute for the first function and/or the second function.

In some embodiments, the system may apply a constraint and/or requirement to a type of data function based on the selected application design attribute. For example, as the system may not generate the actual data (e.g., populate the application content prior to creating an application), the system may need to automatically determine if a selected application design attribute interferes with and/or obscures data populated in a function. For example, an application design attribute setting a small size for a function may interfere with the ability of an end-user to see small type and/or a chart in the application. Therefore, the system may need to alert the user to this issue. The system may thus determine these issues based on comparisons with thresholds related to attributes. For example, the system may determine a threshold application content attribute based on the first application design attribute. The system may compare the first application content attribute to the threshold application content attribute. The system may apply the first application content attribute to the first function based on the first application content attribute corresponding to the threshold application content attribute. If the system determines that the first application content attribute does not correspond to the threshold application content attribute, the system may generate an alert (e.g., alert 152 (FIG. 1)).

Additionally or alternatively, in some embodiments, the system may apply a constraint and/or requirement to a type of data function based on the selected application content attribute of another function. For example, the system may not generate the actual data (e.g., populate the application content prior to creating an application), and the system may need to automatically determine if a selected application content attribute relates to data populated in another function. For example, if two adjacent functions are set to present the same type of data (e.g., the same value (e.g., title) for two graphs), the system may alert the user. The system may thus determine these issues based on comparisons with thresholds related to attributes and/or between two or more attributes of functions. For example, if an application (e.g., a micro frontend dependent application) at run time (e.g., at a time the micro frontend dependent architecture is generated) is configured to present a duplicate column of data based upon time period user input by the application developer, the function (and/or system) may drop one of the two columns in order to improve the user experience.

For example, the system may receive a second user input, wherein the second user input comprises a second function for including in the micro frontend dependent architecture, and wherein the second function corresponds to a second micro frontend fragment. The system may receive a sixth user input, wherein the sixth user input defines a second application content attribute for the second function, wherein the second application content attribute comprises a content identifier for content populated in the second function in the micro frontend dependent architecture. The system may determine a threshold application content attribute based on the first application content attribute. The system may compare the second application content attribute to the threshold application content attribute. The system may apply the second application content attribute to the second function based on the second application content attribute corresponding to the threshold application content attribute. If the system determines that the second application content attribute does not correspond to the threshold application content attribute, the system may generate an alert (e.g., alert 152 (FIG. 1)).

At step 508, process 500 (e.g., using one or more components described above) receives a request for generation of the micro frontend dependent architecture. For example, the system may receive, e.g., by the control circuitry, a fifth user input, wherein the fifth user input requests generation of the micro frontend dependent architecture, wherein the micro frontend dependent architecture includes a first application for a first application developer. For example, the system may receive a user input from a user to generate a series of applications in which each application has a standardized application design and function type, but the system individually populates each with developer-specific data.

At step 510, process 500 (e.g., using one or more components described above) populates the function. For example, the system may populate, e.g., by the first micro frontend fragment, the first function with first application content in the first application. For example, the system may populate the first function by determining a first data source corresponding to the first application developer, retrieving available first application content from the first data source, and filtering the available first application content based on the first application content attribute. For example, the system may use the micro frontend fragment to populate the end-user specific content by accessing end-user specific databases (e.g., featuring natively stored available application content that may be aggregated, modified, filtered, etc. to generate the end-user specific content requested by each function specific micro frontend fragment). By limiting only certain types of data to "on-the-fly" generation, the system may limit the amount of data that must be stored and relieve privacy/security concerns. Additionally, by standardizing the application design, the system may limit the amount of processing required to distribute the micro frontend dependent architecture.

At step 512, process 500 (e.g., using one or more components described above) generates the populated function based on application design attribute. For example, the system may generate the first application for the first application developer, wherein the first application content is generated for display, on a first device corresponding to the first application developer, at a display location based on the first application design attribute. For example, the system may allow users to modify the look and feel of an application and/or the type of application content presented, without actually having to access developer-specific content. Accordingly, each end-user (e.g., developer) may receive an application in a standardized format, but with developer-specific data.

In some embodiments, the system may generate a container for the application and/or the micro frontend dependent architecture. For example, the container may comprise a lightweight, standalone software package that includes everything needed to run an application, implement the micro frontend dependent architecture, etc., including the code, runtime, system tools, libraries, and settings. Containers may provide a consistent and isolated environment for running applications, ensuring that they work reliably across different computing environments. In some embodiments, the container for the application and/or the micro frontend dependent architecture may be stored in a library of containers for later retrieval and/or use. For example, the system may generate a container comprising the first application. The system may then store the container at a remote storage location specific to the first application.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of generating micro frontend dependent applications featuring consistent application design and dynamically-determined application content across computer networks for application developer-specific application development.

2. A method for monitoring application activity in micro frontend dependent applications without using shell applications.

3. The method of any one of the preceding embodiments, the method comprising: receiving, at a user interface, a first user input, wherein the first user input comprises a first function for including in a micro frontend dependent architecture, wherein the first function corresponds to a first micro frontend fragment; receiving, at the user interface, a third user input, wherein the third user input defines a first application design attribute for the first function, wherein the first application design attribute comprises an identifier for where the first function is presented in the micro frontend dependent architecture; receiving, at the user interface, a fourth user input, wherein the fourth user input defines a first application content attribute for the first function, wherein the first application content attribute comprises an identifier for content populated in the first function in the micro frontend dependent architecture; receiving, at the user interface, a fifth user input, wherein the fifth user input requests generation of the micro frontend dependent architecture, wherein the micro frontend dependent architecture includes a first application for a first application developer; populating, by the first micro frontend fragment, the first function with first application content in the first application by: determining a first data source corresponding to the first application developer; retrieving available first application content from the first data source; and filtering the available first application content based on the first application content attribute; generating for display, at the user interface, the first application content, on a first device corresponding to the first application developer, at a display location based on the first application design attribute.

4. The method of any one of the preceding embodiments, further comprising: receiving a second user input, wherein the second user input comprises a second function for including in the micro frontend dependent architecture, and wherein the second function corresponds to a second micro frontend fragment; receiving a sixth user input, wherein the sixth user input defines a second application content attribute for the second function, wherein the second application content attribute comprises a content identifier for content populated in the second function in the micro frontend dependent architecture; and populating, by the second micro frontend fragment, the second function with second application content in the first application by: determining the first data source corresponding to the first application developer; retrieving available second application content from the first data source; and filtering the available second application content based on the second application content attribute.

5. The method of any one of the preceding embodiments, further comprising: determining a section attribute for a section, in the micro frontend dependent architecture, comprising the first function; determining a threshold application design attribute based on the section attribute; comparing the first application design attribute to the threshold application design attribute; and applying the first application design attribute to the first function based on the first application design attribute corresponding to the threshold application design attribute.

6. The method of any one of the preceding embodiments, further comprising: determining a threshold application content attribute based on the first application design attribute; comparing the first application content attribute to the threshold application content attribute; and applying the first application content attribute to the first function based on the first application content attribute corresponding to the threshold application content attribute.

7. The method of any one of the preceding embodiments, further comprising: receiving a second user input, wherein the second user input comprises a second function for including in the micro frontend dependent architecture, and wherein the second function corresponds to a second micro frontend fragment; receiving a sixth user input, wherein the sixth user input defines a second application content attribute for the second function, wherein the second application content attribute comprises a content identifier for content populated in the second function in the micro frontend dependent architecture; determining a threshold application content attribute based on the first application content attribute; comparing the second application content attribute to the threshold application content attribute; and applying the second application content attribute to the second function based on the second application content attribute corresponding to the threshold application content attribute.

8. The method of any one of the preceding embodiments, wherein each application based on the micro frontend dependent architecture comprises a series of sections that defines a layout of the micro frontend dependent architecture, and wherein each section of the series of sections is defined by a respective grid.

9. The method of any one of the preceding embodiments, wherein the first application design attribute for the first function comprises a mapping of the first function to the respective grid of a section of the series of sections in which the first function is presented in the micro frontend dependent architecture.

10. The method of any one of the preceding embodiments, further comprising: retrieving the first function from a library of available functions; and retrieving the first micro frontend fragment from a plurality of micro frontend fragments, wherein each micro frontend fragment of the plurality of micro frontend fragments comprises a rendering engine specific to a respective function of the library of available functions.

11. The method of any one of the preceding embodiments, further comprising receiving a seventh user input, wherein the seventh user input defines a third application design attribute for the first function, wherein the third application design attribute comprises an identifier for what shape the first function is presented in the micro frontend dependent architecture.

12. The method of any one of the preceding embodiments, the method comprising: generating a container comprising the first application; and storing the container at a remote storage location specific to the first application.

13. The method of any one of the preceding embodiments, wherein the first application content comprises a header or footer for the first application.

14. The method of any one of the preceding embodiments, further comprising: in response to determining that the first function includes the first micro frontend fragment, determining a first application programming interface for the first micro frontend fragment; and in response to determining the first application programming interface for the first micro frontend fragment, generating a first authorization request to authorize a first application programming interface for the first micro frontend fragment.

15. The method of any one of the preceding embodiments, further comprising: receiving a first authorization request to authorize a first application programming interface for the first micro frontend fragment; retrieving a governance protocol; and authorizing the first application programming interface based on the governance protocol.

16. The method of any one of the preceding embodiments, wherein authorizing the first application programming interface based on the governance protocol further comprises: retrieving a first application characteristic of the first application programming interface; retrieving a first governance characteristic of the governance protocol; and comparing the first application characteristic to the first governance characteristic.

17. The method of any one of the preceding embodiments, the method comprising: receiving, on a user device, a first user input to launch a first application on the user device, wherein the first application comprises a plurality of functions, and wherein each function of the plurality of functions comprises pre-approved application programming interfaces; retrieving, from the plurality of functions, a clickstream event tracking function for the first application; determining that the clickstream event tracking function includes a first micro frontend fragment and a second micro frontend fragment; and in response to determining that the clickstream event tracking function includes the first micro frontend fragment and the second micro frontend fragment, executing an application start-up procedure for the first application, wherein the application start-up procedure includes a first instruction to the first micro frontend fragment to bootstrap a first start-up procedure for the first micro frontend fragment to the first application, and wherein the application start-up procedure includes a second instruction to the second micro frontend fragment to bootstrap a second start-up procedure for the second micro frontend fragment to the first application; and causing to be generated for display, in a user interface on the user device, the first application, wherein the first application comprises first content corresponding to the first micro frontend fragment and second content corresponding to the second micro frontend fragment.

18. The method of any one of the preceding embodiments, further comprising: in response to determining that the clickstream event tracking function includes the first micro frontend fragment, determining a first application programming interface for the first micro frontend fragment; and in response to determining the first application programming interface for the first micro frontend fragment, generating a first authorization request to authorize a first application programming interface for the first micro frontend fragment.

19. The method of any one of the preceding embodiments, further comprising: receiving a first authorization request to authorize a first application programming interface for the first micro frontend fragment; retrieving a governance protocol; and authorizing the first application programming interface based on the governance protocol.

20. The method of any one of the preceding embodiments, wherein authorizing the first application programming interface based on the governance protocol further comprises: retrieving a first application characteristic of the first application programming interface; retrieving a first governance characteristic of the governance protocol; and comparing the first application characteristic to the first governance characteristic.

21. The method of any one of the preceding embodiments, wherein authorizing the first application programming interface based on the governance protocol further comprises: receiving a second authorization request to authorize a second application programming interface for the first micro frontend fragment; retrieving a governance protocol; and rejecting the second authorization request based on the governance protocol.

22. The method of any one of the preceding embodiments, wherein retrieving the clickstream event tracking function for the first application comprises: receiving a function reference; and parsing the plurality of functions using the function reference.

23. The method of any one of the preceding embodiments, wherein parsing the plurality of functions using the function reference comprises: retrieving a device capability requirement based on the function reference; and filtering available functions in the plurality of functions based on the device capability requirement.

24. The method of any one of the preceding embodiments, wherein parsing the plurality of functions using the function reference comprises: retrieving a user preference based on the function reference; and filtering available functions in the plurality of functions based on the user preference.

25. The method of any one of the preceding embodiments, wherein causing to be generated for display the first application further comprises: detecting a likelihood of use of the first content; and pre-fetching the first content during start-up of the first application.

26. The method of claim 2, wherein the application start-up procedure comprises: loading the first application; and in response to loading the first application, loading the first micro frontend fragment.

27. The method of any one of the preceding embodiments, further comprising: determining an application requirement for the first application; and selecting the clickstream event tracking function from a plurality of functions based on the application requirement.

28. The method of any one of the preceding embodiments, wherein selecting the clickstream event tracking function from the plurality of functions further comprises: determining a respective status of each function of the plurality of functions; and filtering the plurality of functions based on the respective status.

29. The method of any one of the preceding embodiments, wherein selecting the clickstream event tracking function from the plurality of functions further comprises: determining an alternative function for the clickstream event tracking function; and determining an alternative micro frontend fragment corresponding to the alternative function.

30. One or more non-transitory, computer readable mediums storing instructions that, when executed by a data processing apparatus, cause the data processing apparatus to perform operations comprising those of any of embodiments 1-29.

31. A system comprising one or more processors; and memory storing instructions that, when executed by the processors, cause the processors to effectuate operations comprising those of any of embodiments 1-29.

32. A system comprising means for performing any of embodiments 1-29.

What is claimed is:

1. A system for monitoring application activity in micro frontend dependent applications without using shell applications, the system comprising:
a first micro frontend fragment, wherein the first micro frontend fragment comprises a first web application component, and wherein the first micro frontend fragment uses a first microservice to provide first content;
a second micro frontend fragment, wherein the second micro frontend fragment comprises a second web application component, and wherein the second micro frontend fragment uses a second microservice to provide second content; and
a first application, wherein the first application comprises a plurality of functions, wherein each function of the plurality of functions comprises pre-approved application programming interfaces, wherein the first application performs operations comprising:
receiving a first user input to launch a first application on a user device, wherein the first application comprises application software that runs in a web browser;
retrieving, from the plurality of functions, a clickstream event tracking function for the first application;
determining that the clickstream event tracking function includes the first micro frontend fragment and the second micro frontend fragment; and
in response to determining that the clickstream event tracking function includes the first micro frontend fragment and the second micro frontend fragment, executing, an application start-up procedure for the first application, wherein the application start-up procedure includes a first instruction to the first micro frontend fragment to bootstrap a first start-up procedure for the first micro frontend fragment to the first application, and wherein the application start-up procedure includes a second instruction to the second micro frontend fragment to bootstrap a second start-up procedure for the second micro frontend fragment to the first application; and
causing to be generated for display, in a user interface on the user device, the first application, wherein the first application comprises first content corresponding to the first micro frontend fragment and second content corresponding to the second micro frontend fragment.

2. A method for monitoring application activity in micro frontend dependent applications without using shell applications, the method comprising:
receiving, on a user device, a first user input to launch a first application on the user device, wherein the first application comprises a plurality of functions, and wherein each function of the plurality of functions comprises pre-approved application programming interfaces;
retrieving, from the plurality of functions, a clickstream event tracking function for the first application;
determining that the clickstream event tracking function includes a first micro frontend fragment and a second micro frontend fragment; and
in response to determining that the clickstream event tracking function includes the first micro frontend fragment and the second micro frontend fragment, executing an application start-up procedure for the first application, wherein the application start-up procedure includes a first instruction to the first micro frontend fragment to bootstrap a first start-up procedure for the first micro frontend fragment to the first application, and wherein the application start-up procedure includes a second instruction to the second micro frontend fragment to bootstrap a second start-up procedure for the second micro frontend fragment to the first application; and causing to be generated for display, in a user interface on the user device, the first application, wherein the first application comprises first content corresponding to the first micro frontend fragment and second content corresponding to the second micro frontend fragment.

3. The method of claim 2, further comprising:
in response to determining that the clickstream event tracking function includes the first micro frontend fragment, determining a first application programming interface for the first micro frontend fragment; and
in response to determining the first application programming interface for the first micro frontend fragment, generating a first authorization request to authorize a first application programming interface for the first micro frontend fragment.

4. The method of claim 2, further comprising:
receiving a first authorization request to authorize a first application programming interface for the first micro frontend fragment;
retrieving a governance protocol; and
authorizing the first application programming interface based on the governance protocol.

5. The method of claim 4, wherein authorizing the first application programming interface based on the governance protocol further comprises:
retrieving a first application characteristic of the first application programming interface;
retrieving a first governance characteristic of the governance protocol; and
comparing the first application characteristic to the first governance characteristic.

6. The method of claim 4, wherein authorizing the first application programming interface based on the governance protocol further comprises:
receiving a second authorization request to authorize a second application programming interface for the first micro frontend fragment;
retrieving a governance protocol; and
rejecting the second authorization request based on the governance protocol.

7. The method of claim 2, wherein retrieving the clickstream event tracking function for the first application comprises:
receiving a function reference; and
parsing the plurality of functions using the function reference.

8. The method of claim 7, wherein parsing the plurality of functions using the function reference comprises:
retrieving a device capability requirement based on the function reference; and
filtering available functions in the plurality of functions based on the device capability requirement.

9. The method of claim 7, wherein parsing the plurality of functions using the function reference comprises:
retrieving a user preference based on the function reference; and
filtering available functions in the plurality of functions based on the user preference.

10. The method of claim 2, wherein causing to be generated for display the first application further comprises:
detecting a likelihood of use of the first content; and
pre-fetching the first content during start-up of the first application.

11. The method of claim 2, wherein the application start-up procedure comprises:
loading the first application; and
in response to loading the first application, loading the first micro frontend fragment.

12. The method of claim 2, further comprising:
determining an application requirement for the first application; and
selecting the clickstream event tracking function from a plurality of functions based on the application requirement.

13. The method of claim 12, wherein selecting the clickstream event tracking function from the plurality of functions further comprises:
determining a respective status of each function of the plurality of functions; and
filtering the plurality of functions based on the respective status.

14. The method of claim 12, wherein selecting the clickstream event tracking function from the plurality of functions further comprises:
determining an alternative function for the clickstream event tracking function; and
determining an alternative micro frontend fragment corresponding to the alternative function.

15. One or more non-transitory, computer readable mediums having instructions recorded thereon that when executed by one or more processors causes operations comprising:
receiving, on a user device, a first user input to launch a first application on a user device, wherein the first application comprises a plurality of functions, wherein each function of the plurality of functions comprises pre-approved application programming interfaces;
retrieving, from the plurality of functions, a clickstream event tracking function for the first application;
determining that the clickstream event tracking function includes a first micro frontend fragment and a second micro frontend fragment; and
in response to determining that the clickstream event tracking function includes the first micro frontend fragment and the second micro frontend fragment, executing, a application start-up procedure for the first application, wherein the application start-up procedure includes a first instruction to the first micro frontend fragment to bootstrap a first start-up procedure for the first micro frontend fragment to the first application, and wherein the application start-up procedure includes a second instruction to the second micro frontend fragment to bootstrap a second start-up procedure for the second micro frontend fragment to the first application; and
causing to be generated for display, in a user interface on the user device, the first application, wherein the first application comprises first content corresponding to the first micro frontend fragment and second content corresponding to the second micro frontend fragment.

16. The one or more non-transitory, computer readable mediums of claim 15, wherein the instructions further cause operations comprising:
in response to determining that the clickstream event tracking function includes the first micro frontend fragment, determining a first application programming interface for the first micro frontend fragment; and in response to determining the first application programming interface for the first micro frontend fragment, generating a first authorization request to authorize a first application programming interface for the first micro frontend fragment.

17. The one or more non-transitory, computer readable mediums of claim 15, wherein the instructions further cause operations comprising receiving a first authorization request to authorize a first application programming interface for the first micro frontend fragment;

retrieving a governance protocol; and authorizing the first application programming interface based on the governance protocol.

18. The one or more non-transitory, computer readable mediums of claim 17, wherein authorizing the first application programming interface based on the governance protocol further comprises:

retrieving a first application characteristic of the first application programming interface;

retrieving a first governance characteristic of the governance protocol; and comparing the first application characteristic to the first governance characteristic.

19. The one or more non-transitory, computer readable mediums of claim 17, wherein authorizing the first application programming interface based on the governance protocol further comprises:

receiving a second authorization request to authorize a second application programming interface for the first micro frontend fragment;

retrieving a governance protocol; and rejecting the second authorization request based on the governance protocol.

20. The one or more non-transitory, computer readable mediums of claim 15, wherein retrieving the clickstream event tracking function for the first application comprises:

receiving a function reference; and parsing the plurality of functions using the function reference.

* * * * *